United States Patent [19]

Ashkin et al.

[11] 3,810,131

[45] May 7, 1974

[54] DEVICES EMPLOYING THE INTERACTION OF LASER LIGHT WITH MAGNETIC DOMAINS

[75] Inventors: Arthur Ashkin, Rumson; Joseph Martin Dziedzic, Clark, both of N.J.

[73] Assignee: Bell Telephone Laboratories, Incorporated, Murray Hill, N.J.

[22] Filed: July 18, 1972

[21] Appl. No.: 272,787

[52] U.S. Cl. .................... 340/174 YC, 340/174 TF

[51] Int. Cl. .................... G11c 11/14, G11c 11/42

[58] Field of Search .............. 340/174 TF, 174 YC, 173 LM, 340/179.1 M; 346/74 MT

[56] References Cited

UNITED STATES PATENTS

| | | | |
|---|---|---|---|
| 3,506,974 | 4/1970 | LeCraw et al. | 340/174 TF |
| 3,702,993 | 11/1972 | Neuhaus | 340/174 YC |
| 3,715,734 | 2/1973 | Fajans | 340/173 LM |
| 3,644,908 | 2/1972 | Bobeck | 340/174 TF |

OTHER PUBLICATIONS

IBM Technical Disclosure Bulletin, Vol. 13, No. 7, Dec. 1970, pg. 1788–1790.

*Primary Examiner*—James W. Moffitt
*Attorney, Agent, or Firm*—W. L. Wisner

[57] ABSTRACT

Focused laser light, when partially absorbed to cause localized heating in low coercivity magnetic layers of the type used in conventional bubble devices, is employed to manipulate bubble and strip magnetic domains. Bubbles and strips are thermally nucleated or annihilated as well as captured and moved about freely, by an incident laser beam of variable power without the use of outside connections, conductor loops or magnetic elements. Bubbles are arranged in fixed arrays and propagated at high velocities through well-defined patterns. Simplified memory devices are disclosed using laser techniques. There is also disclosed a novel form of reversible strip domain writing in low coercivity layers with the laser beam. Each of the disclosed arrangements has potential application to bubble devices and to various magneto-optical information storage, processing and display devices.

7 Claims, 23 Drawing Figures

DEVICES EMPLOYING THE INTERACTION OF LASER LIGHT WITH MAGNETIC DOMAINS

FIELD OF THE INVENTION

This invention relates to magnetic devices and, more particularly, to such devices employing the interaction of laser light with magnetic domains.

BACKGROUND OF THE INVENTION

Domain behavior in magnetic materials has been investigated extensively over the last several decades. Domain writing was first accomplished by drawing the end of a magnetized wire across the surface of a thin layer of magnetic material, such as manganese bismuth, which was initially magnetized to saturation normal to the surface by the application of an external bias field. Magnetic domains, characterized by localized regions of reverse magnetization, could be made to appear in the layer in the pattern drawn by the wire. It was found that these regions could be viewed or detected by illuminating the layer with polarized light, which is differently rotated by the regions having opposite directions of magnetization, i.e., by the Faraday effect. Such forms of writing have been implemented in various magneto-optical information storage and display devices. A subsequently proposed thermomagnetic writing technique, commonly called Curie point writing, involves the use of a thin layer of magnetic material magnetized normal to a major surface which is locally heated in a given region to a temperature above its Curie temperature. A magnetic material becomes nonmagnetic above its Curie point. As it cools, however, the locally heated region becomes magnetic again, but generally in the reverse direction. Magnetic domains can thus be made to appear in the heated regions of the layer. The effect has been attributed to the demagnetizing influence of the area of the layer surrounding the temporarily nonmagnetic region, which causes a reversal of the direction of magnetization in the region as it cools. See, for example, Volume 29 of *Journal of Applied Physics*, p. 1003 (1958).

More recently proposed variations of Curie point writing involve heating a localized region of a magnetic layer to a characteristic temperature which affects the magnetization in the region but which is generally somewhat less than its Curie temperature. Two such variations are compensation temperature writing (see Volume 36 of *Journal of Applied Physics*, p. 1110 (1965)) and spin reorientation writing (see Volume 42 of *Journal of Applied Physics*, p. 1804 (1971)). In each case, an external magnetic field of sufficient magnitude to alter the magnetization in the heated regions and not that in the unheated, surrounding area of the layer is applied to orient the heated region in the desired reverse direction. Magnetic domains can thus be locked in their new orientation as the heated region cools.

In each of the foregoing thermomagnetic writing arrangements, the localized heating can be accomplished using a heated stylus, a focused electron beam, or a focused laser beam. In arrangements in which the various forms of domain writing are used for information storage, the requisite characteristics are considered to be the ease of nucleation and the stability of the domains. Materials characterized by low nucleation fields and high domain wall coercivities were thus thought to be essential to nucleate domains that could be stably stored for extended periods of time.

As should be known to those skilled in the art, a domain wall is the transition zone or interface between regions of opposite magnetization. The domain wall coercivity is a measure of the inherent magnetic "hardness" or hysteresis of a material, i.e., its resistance to change in the direction of magnetization with changing field. High coercivity is a property typically associated with permanent magnets.

In the past several years, magnetic domains have been proposed for use in memory and data processing devices. An exemplary member of this class of devices, sometimes referred to as "bubble" devices, employs small, enclosed, cylindrically-shaped regions of magnetization opposite to that of the surrounding area of a thin magnetic layer. See for example, Volume MAG-7, *IEEE Transactions*, p. 461 (1971). In such devices, the ability to nucleate, propagate and position the small bubble domains in well-defined patterns is of primary importance. Successful device utilization accordingly depends upon the development of suitable magnetic materials and arrangements which facilitate such operations.

In an effort to find suitable materials in which small bubbles can be stored and propagated at high velocities, a class of oxidic magnetic materials has recently been studied. The class is best exemplified by the single crystalline orthoferrites and the iron-containing members of the garnet structure. If properly grown and fabricated, such materials, in addition to supporting small cylindrical domains at very high densities, exhibit the combined properties of low domain wall coercivity and high domain wall mobility. The increased mobility present in these materials is generally at the expense of inherent domain stability, although stable bubble domain operating ranges can be found by adjusting the applied bias field.

In conventional bubble arrangements employing the low coercivity materials, the cylindrical domains are propagated by localized gradients in magnetic field. One propagation arrangement utilizes a pattern of minute electrical conductors, each designed to form conductor loops which generate the requisite field gradients when externally pulsed. The loops are interconnected and pulsed in a 3-phase manner to produce shift register operation as disclosed in U.S. Pat. No. 3,460,160, issued Aug. 5, 1969.

An alternate bubble propagation arrangement employs patterns of minute, magnetically soft overlay elements in a T- or Y-bar form which are disposed adjacent to the surface of a layer in which cylindrical domains are moved. In response to an applied magnetic field reorienting in the plane of the layer, changing pole patterns are generated in the elements which serve to displace domains along a selected path. Arrangements of this type are disclosed in U.S. Pat. No. 3,534,347, issued Oct. 13, 1970.

These propagation arrangements require that a great many conductor loops or magnetic elements whose dimensions are comparable to the bubble size be accurately positioned adjacent to the surface of the layer in which the domains move. Additionally, propagation is possible with these arrangments only along the preselected paths determined by the loops or elements. It would be desirable in certain applications to have a mechanism for nucleating propagating and positioning magnetic domains in magnetic layers without the use of such arrangements.

In Volume 50 of the *Bell System Technical Journal*, pp. 711–724, A. A. Thiele and others note that cylindrical domains may be moved in low coercivity bubble materials by gradients not only in magnetic field but in any of the individual parameters which determine the total domain energy. The authors suggest that it should be possible to move cylindrical domains by utilizing focused laser light as a source of temperature gradients in certain classes of magnetic materials. It is indicated that, in a temperature-dependent bubble material, in which a domain tends to move towards a region of high temperature, a bubble will tend to follow a focused laser beam moving nearby; whereas, in a bubble material having the opposite temperature characteristic, a bubble will be pushed by the beam.

SUMMARY OF THE INVENTION

The present invention is based upon the results of an experimental study involving the interaction of laser light with magnetic domains in layers of low coercivity magnetic materials of the type used in conventional bubble arrangements. For the purposes of our invention, a low coercivity magnetic material is one that has a coercivity of the order of 10 oersteds or less.

Our study has revealed that it is possible both to nucleate and annihilate small bubble domains in low coercivity materials simply by using focused laser light of variable power which is at least partially absorbed by the materials to cause localized heating. The bubbles can be nucleated either by cutting strip domains or by fissioning single bubble domains in a layer with a laser beam. Bubbles can also be nucleated in open regions free of either bubble or strip domains by an arrangement which is analogous to conventional Curie point writing in high coercivity materials. In the latter arrangement, the small, cylindrical domains are nucleated in low coercivity layers with a focused laser beam alone, without the assistance of external magnetic fields for orienting the magnetization in the locally heated regions into the desired direction. In both arrangements the effects observed are attributed to the ability of the laser beam to give rise to large temperature gradients in localized regions of the layer, the temperature varying over wide ranges in areas less than the typical bubble size. The large localized temperature gradients in turn give rise to large but controllable forces on the domains.

As suggested by Thiele et al in the above-cited article, we have found that bubble domains can be moved in low coercivity magnetic layers by using a laser beam moving relative thereto. Quite unexpectedly, we have further found that motion both away or toward a laser heated spot is possible in the same magnetic material simply by adjusting the laser power. In the materials tested, we found repulsion from the laser spot at relatively high laser powers and attraction at relatively low powers. A propagation arrangement using the disclosed laser techniques permits the manipulation of domains in a layer with significantly increased degrees of freedom and accuracy, and without the use of outside connections or fixed arrays of minute conductor loops or magnetic elements.

We have also found that it is possible to create an array of minute burn spots in the low coercivity layers with a laser at increased laser powers. Such burn spots act as pinning centers for bubble domains. It is accordingly possible to fix bubble domains at precise positions and in well-defined arrays in a layer at appropriately placed laser burn spots. It is also possible to remove the bubbles from the spots when desired using a laser beam of appropriate power.

New bubble memory devices utilizing the foregoing arrangements of our invention are potentially versatile in that they combine the features of large storage capacity, high operating speeds, and the convenience of writing, erasing, propagating, fixing and reading magnetic domains in a suitable layer with a single light beam. Illustrative examples of simplified memory devices based upon our invention are disclosed.

In addition to the foregoing, our study has also revealed that various manipulations are possible with magnetic strip domains in the low coercivity layers using focused laser light. The strips, characterized by elongated, enclosed regions of reverse mangetization, can be nucleated with the laser beam and then extended into elaborate patterns using either the attractive or repulsive forces of the beam. The strips can also be erased with a laser by drawing the patterns in reverse. These manipulations constitute a novel form of reversible domain writing which has potential application in the magneto-optical information storage and display art.

BRIEF DESCRIPTION OF THE DRAWING

A more complete understanding of the foregoing and other features and advantages of our invention can be obtained from the following detailed description taken with reference to the accompanying drawing in which.

DETAILED DESCRIPTION

Figure 1:
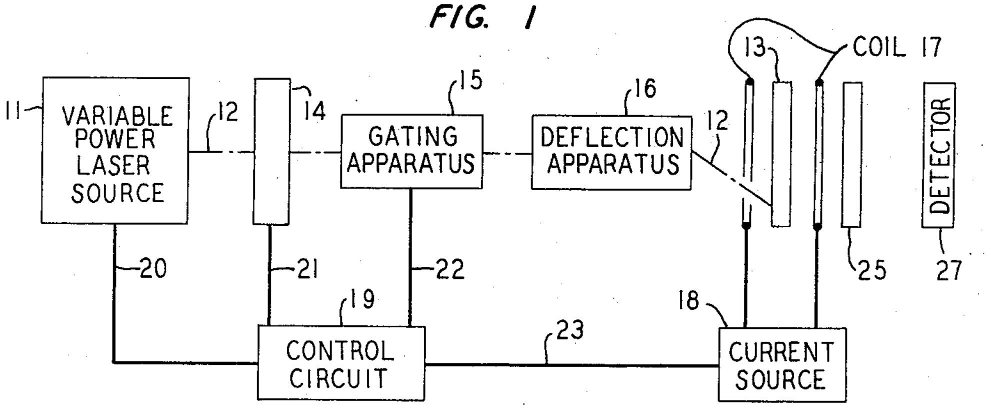
FIG. 1 is a schematic illustration of an illustrative embodiment for carrying out the various operations of the invention.

In the illustrative embodiment of FIG. 1, there is schematically shown an arrangement of the type used in our early experiments involving the interaction of laser light with magnetic domains. The arrangement includes laser source 11, which supplies beam 12 of radiant energy of variable power. Beam 12 is directed at thin layer 13 of low coercivity magnetic material through beam focusing apparatus 14, beam gating apparatus 15 and beam deflection apparatus 16. Gating apparatus 15 is employed to control the time periods of the incidence of beam 12 on layer 13. Coil 17, shown in cross-section, encompasses magnetic layer 13 in an orientation to provide an external magnetic field normal to the layer when activated. Coil 17 is connected across current source 18.

Analyzer 25 and detector 27 are included in the embodiment of FIG. 1 to provide means for detecting the presence of magnetic domains at selected regions of layer 13 utilizing the Faraday effect. The response of detector 27 is illustratively matched to the wavelength of beam 12. Laser source 11, focusing apparatus 14, gating apparatus 15, and current source 18 are illustratively connected to control circuit 19 by means of conductors 20, 21, 22 and 23, respectively. The various sources, focusers, gates, deflectors, circuits, and detectors may be any such elements capable of performing the various operations described below in accordance with the invention. For example, deflection apparatus 16 is illustratively of the type which provides either manual or automatic (e.g., electro-optical or acousto-optical) deflection of beam 12 to the various regions of layer 13. Focusing apparatus 14 is illustratively adjustable to vary the cross-sectional diameter of beam 12.

Figure 2:
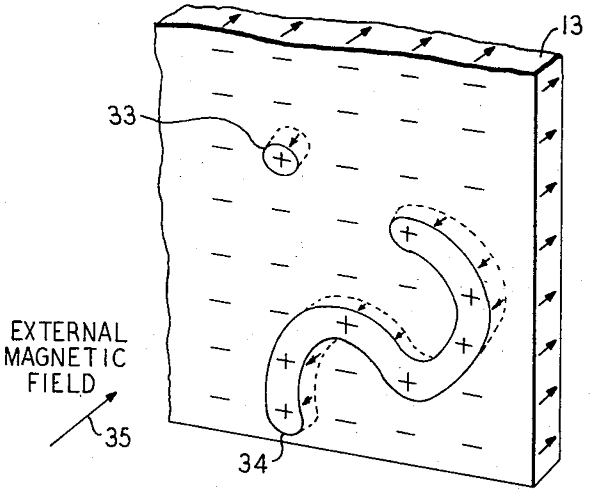
FIG. 2 is a perspective representation of a portion of low coercivity magnetic layer 13 of FIG. 1.

FIG. 2 shows a perspective view of layer 13 which includes, for purposes of illustration, cylindrical bubble domain 33 of the type utilized in devices described in Vol. MAG-7, *IEEE Transactions*, p. 461 (1971), and serpentine-like strip domain 34. Both domains are completely encompassed by a single domain wall which closes on itself in the plane of layer 13. The plus signs indicate magnetized domains with flux directed toward the reader as viewed in FIG. 2, whereas the remainder of the layer is negative, indicating flux directed away from the reader. The direction of the applied external magnetic field, the bias field, is indicated by arrow 35. A bias field of about 40 oersteds is a typical operating magnitude for bubble devices. The bubble domains are normally stable over a range of magnitudes of applied field, e.g., a range of about 15 oersteds. The precise limits of the range depend primarily upon the material of the layer. The strip domains are typically stable at bias fields that are somewhat lower in magnitude than those at which bubble domains are stable, although typically there are ranges in which both types of domains can stably exist. The bubbles have diameters ranging anywhere from a micron to several hundred microns, again depending upon the material and the applied field.

As previously mentioned, properly grown and fabricated orthoferrite materials possess suitably low coercivities and high mobilities for bubble devices. These materials comprise a special class of ferrites with the chemical formula $RFeO_3$, where R represents yttrium or one or more rare earth elements. Layer 13 may thus be composed of a thin platelet of a suitable orthoferrite. It may also consist of a suitably processed synthetic ferrimagnetic garnet material. The latter materials have the general formula $A_3Fe_5O_{12}$, whre A can be yttrium, any of the rare earth elements, or, at least in part, lanthanum or bismuth. Both materials are typically used as high quality single crystals which are magnetically anisotropic. The preferred or "easy" direction of magnetization is typically oriented to be normal to the major surfaces of the layer.

A low coercivity magnetic material suitable for our invention may be any one having a coercivity of the order of 10 oersteds or less. Coercivities that are less than 1 oersted are preferred. Suitable orthoferrite and garnet materials can be made to exhibit coercivities as small as a millioersted.

The various operations and arrangements described below are tentatively believed to be thermal in nature and to result from the ability of the laser light, when partially absorbed by low coercivity magnetic layers, to heat localized regions of the layer rapidly, thereby causing large localized temperature gradients therein. The large temperature changes attainable with the absorbed beams over time periods comparable to the thermal time constants of the magnetic materials and across areas small compared to the typical bubble size affect the stability of bubble and strip domain walls in a variety of useful, and heretofore unknown, ways. The large localized temperature gradients give rise to forces on bubble and strip domains which are analogous to the more usual magnetic field gradients.

In each of the following arrangements, beam 12 is illustratively a continuous wave (cw) $TEM_{OO}$ mode 5145 Angstrom (A) light beam from a conventional argon laser source. Unless stated otherwise, the beam is focused by apparatus 14 to a cross-sectional diameter of about 5 microns to interact with domains in 3-micron thick epitaxial ferrimagnetic garnet layers. As should be understood by those skilled in the art, an epitaxial layer is one that copies the crystal lattice of a substrate material upon which it is grown. The garnet material of the formula $Er_2Eu_1Ga_{0.7}Fe_{4.3}O_{12}$ is exemplary of the materials useful in the various arrangements. The optical absorption of this material at 5145 A is approximately 60 percent.

The cw laser operations described below utilize laser powers which vary over a range of 0 to about 1 watt (w). In some arrangements, the laser beam is pulsed on layer 13 for short time periods using gating apparatus 15. This operation has been found to provide larger peak powers in the beam which, in turn, give rise to more localized heating and large temperature gradients in regions of the layer.

FIGS. 3A through 8D are thus illustrative of various magnetic states of layer 13 of FIG. 1 attainable in accordance with our invention.

Figure 3A:
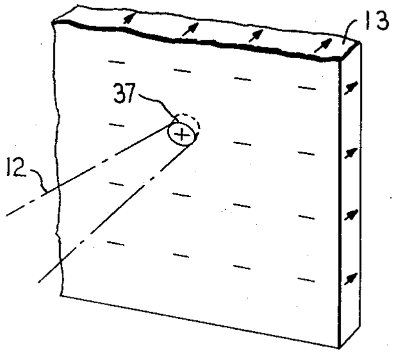
FIGS. 3A, 3B, 4A through 4F, 5A, 5B, 6A through 6D and 7A through 7C are perspective representations of portions of layer 13 illustrative of the various operations with magnetic bubble domains in accordance with the invention.
Figure 3B:
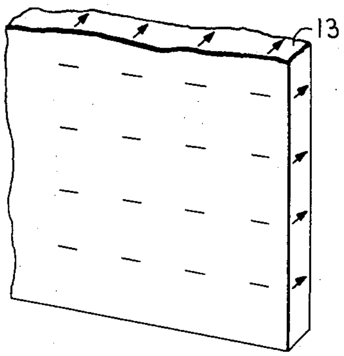

Annihilation and nucleation of bubble domains are performed in low coercivity layer 13 according to our invention with beam 12 having powers in the range of about 60–140 milliwatts (mw). As illustrated in FIG. 3A of the drawing, bubble domain 37 is annihilated simply by hitting it directly with beam 12, illustratively having a peak power of about 80 mw and pulsed on with apparatus 15 for a period of about 20 milliseconds. The beam presumably heats the localized bubble region beyond a characteristic temperature (typically below the Curie temperature) at which the bubble domain is no longer stable. The bubble then collapses and the flux in the layer closes uniformly away from the reader as viewed in FIG. 3B.

Figure 4A:
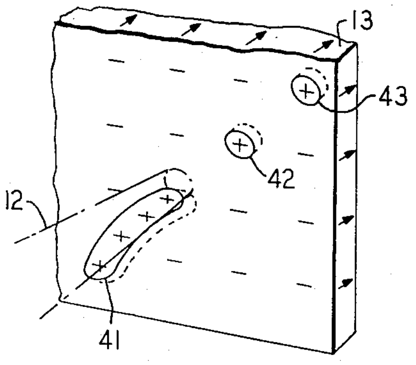
Figure 4B:
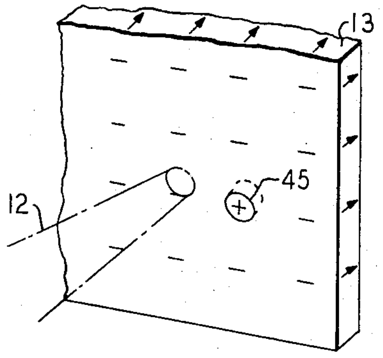
Figure 4C:
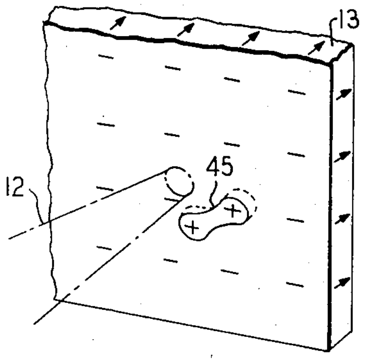
Figure 4D:
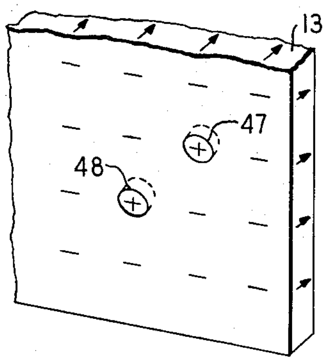

Bubble domains can be created in a number of ways. As illustrated in FIG. 4A, one can simply cut strip domain 41 with cw beam 12 of about 80 mw to nucleate bubble domains 42 and 43. This operation is typically performed with values of applied bias field at which both strip domains and bubble domains are stable in layer 13. Alternatively, as shown in the sequence of FIGS. 4B, 4C and 4D, one can fission single bubble domain 45 by hitting the region adjacent to the bubble with the beam, which is pulsed on for a short period. Fissioning occurs out to a beam center at a distance up to about four bubble diameters from the bubble center, the precise distance depending upon the particular laser power employed. In a typical fissioning arrangement, beam 12 of about 100 mw is pulsed on a region of layer 13 about 3 bubble diameters from bubble 45 for about 20 milliseconds. Bubble domains 47 and 48 result. Using a gated beam which is pulsed on and off for a period of time, arrays of close-packed bubble domains can be created in this manner by multiple fissioning.

Figure 4E:
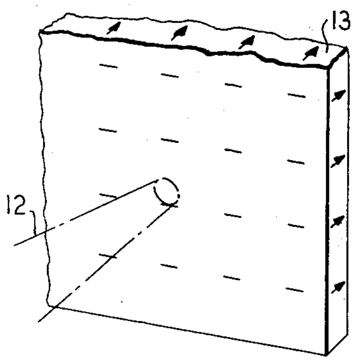
Figure 4F:
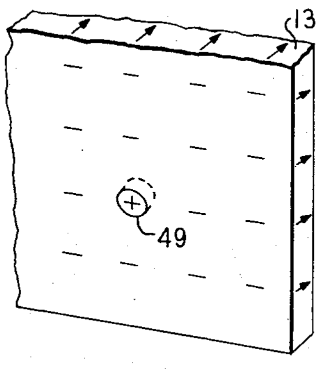

Stable bubbles can also be nucleated in open regions of layer 13 free of either bubble or strip domains by an arrangement which is analogous to conventional Curie point writing in high coercivity magnetic materials. Using beam 12 with about 1 w of cw power, focused to a diameter of about 3 microns and pulsed on for periods of the order of the thermal time constant of the material of layer 13 (e.g., a microsecond), it is possible to heat localized regions of layer 13 to temperatures above the Curie temperature. The arrangement is illustrated in the sequence of FIGS. 4E and 4F. As with conventional Curie point writing, the locally heated region first becomes nonmagnetic: and as it cools, it tends to become magnetic again, but in the reverse direction. The fact that stable bubble domain 49 could be nucleated in low coercivity layer 13 in this manner without the use of an external magnetic field for orienting the magnetization into the desired direction was quite unexpected. The effect is tentatively attributed to the ability of the rapidly pulsed, high intensity laser beam to heat minute regions of the sample rapidly to temperatures above the Curie temperature.

Bubble domains are propagated using the illustrative arrangement of FIG. 1 with either manual or automatic (e.g., electro-optical or acousto-optical) deflection of beam 12. Advantageously, motion both away or toward the laser heated spot in layer 13 is possible according to the invention in the same magnetic material, simply by adusting the laser power. In materials tested, bubble domains were repelled by the focused laser beam having relatively high cw powers in the range of about 70 to 140 mw. Similarly, bubbles could be attracted by a beam having lower cw powers in the range of about 5 to 60 mw. The precise limits on these ranges was found to depend upon the value of the applied bias field and upon the material being tested.

Figure 5A:
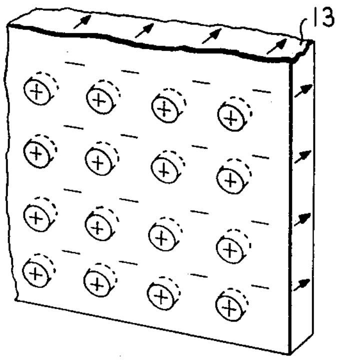

The forces exerted by the beam can cause the bubbles to jump either away from or into the laser spot from several diameters away. When operating in the attractive power range, bubbles can be trapped on the laser spot and moved at will anywhere in layer 13 by moving the laser spot relative to the sample. Well-defined patterns of close-packed bubbles, such as shown in FIG. 5A, can be created by manipulating one bubble at a time with this arrangement. The features of both repulsion and attraction by the laser spot in the same material conveniently permit bubbles to be propagated and positioned with high degrees of freedom and accuracy and without the use of the conventional conductor loops or magnetic elements. These features suggest the possibility of magnetically recording and manipulating information at high densities in bubble devices using only a single external laser beam.

The maximum velocity at which bubble domains can be propagated using laser techniques is limited by the thermal time constant of the magnetic material utilized and/or by its inherent domain wall mobility. Experimentally, velocities of at least 50 centimeters per second have been observed. These velocities were achieved by magnetically rotating beam 12 which carried a bubble about a 700 micron diameter circular orbit at about 200 cycles per second. Based upon the estimated average thermal time constant of low coercivity magnetic materials conventionally used in bubble devices in the range of about 0.1 to 1 microseconds, the limitation on bubble velocity using this technique is in the range of approximately 1,000–10,000 centimeters per second. For a laser power of about 10 mw, motion at these velocities represents an energy expenditure of approximately $10^{-8}$ to $10^{-9}$ joules for a two bubble diameter displacement. A substantial improvement in this expenditure is possible using low coercivity materials having shorter thermal time constants. Alternatively, one can use a magnetic material, the magnetic characteristics of which are more sensitive to temperature. Most bubble materials now known are processed to be relatively insensitive to temperature.

Figure 5B:
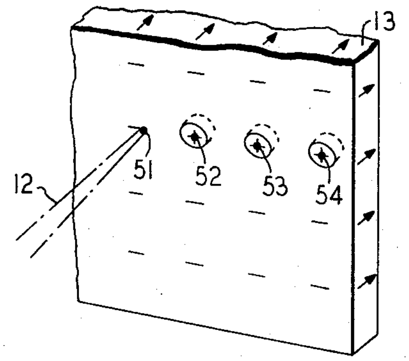

To fix bubble domains in various positions in layer 13, it is possible to create arrays of minute burn spots, such as spots 51, 52, 53 and 54 in FIG. 5B, with beam 12 by adjusting the laser power to approach the burn power. The burn spots can be made substantially smaller than the typical bubble diameter by finely focusing the laser beam during the burn. Illustratively, beam 12, having a cw power of about 1 w, focused to a diameter of about 3 microns and pulsed on a region of layer 13 for about 20 milliseconds, will give rise to burn spot 51, for example, having a diameter of about 2 microns. The spots constitute defects in the material of the layer which interact with a domain wall and prevent it from moving in the absence of large external fields. Bubble domains can thus be fixed in layer 13 at well-defined bit locations and in well-defined patterns at the various burn spots, while other bubbles are moved about freely in other nearby areas of the layer. Bubble domains can be subsequently removed from the burn spots using the attractive or repulsive forces exerted by the laser beam.

Extended matrix-like rectangular arrays of the laser burn spots in layer 13 could form convenient arrangements for storing information. Alternate columns or rows of burn spots in the arrays could be used to represent the binary "1" and "0." The presence of a bubble domain in a "1" column and its absence in an adjacent "0" column, for example, could represent a binary "1" for a particular row in the array. In such an array, a binary "1" can then be converted to a binary "0," and vice versa, simply by moving the bubble from one column to an adjacent column with beam 12.

As illustrative examples of the possible implementation of the foregoing arrangments, we have devised and operated simplified memory devices using only the disclosed laser propagation techniques.

Figure 6A:
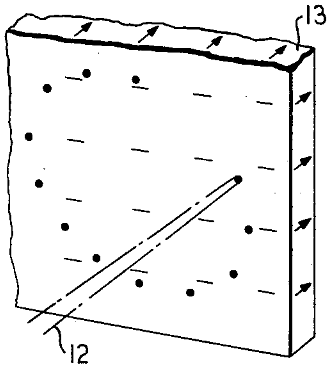

In the sequence of FIGS. 6A, 6B, 6C, and 6D, there is represented a memory arrangement utilizing the apparatus of FIG. 1 in which bubbles can be introduced, positioned and shifted in an endless-loop two-dimensional shift register. We start by creating a plurality of burn spots with laser beam 12 in a selected region of layer 13. The burn spots are arranged in a path or loop that closes on itself in the plane of the layer, as seen in FIG. 6A. They are illustratively spaced apart in the loop by about three bubble radii in distance. Each discrete burn spot in the loop serves as a bit location for information to be stored therein. The information is typically represented in binary format by the presence or absence of a bubble domain at the discrete locations, the presence of a bubble typically representing a binary "1" and its absence, a binary "0."

Figure 6B:
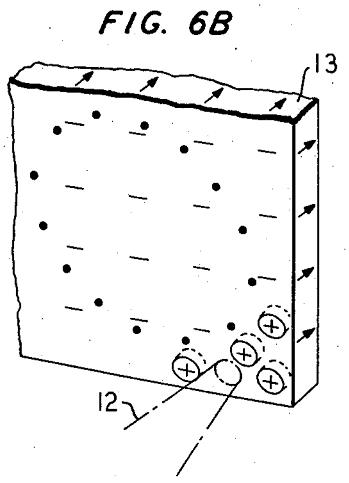

Next, as shown in FIG. 6B, bubbles are nucleated with beam 12 in a region of layer 13 in proximity of the just created burn spot loop. Nucleation can be accomplished by any of the previously described arrangements, or by any combination thereof. The bubbles can be created individually, when needed, or at one time in a group. For example, it is possible first to nucleate a single bubble in an open region of layer 13 using beam 12 in a high-powered, rapidly pulsed operation. This bubble can then be continuously fissioned using beam 12 in a lower-powered, pulsed operation until the desired number of bubbles have been created.

Figure 6C:
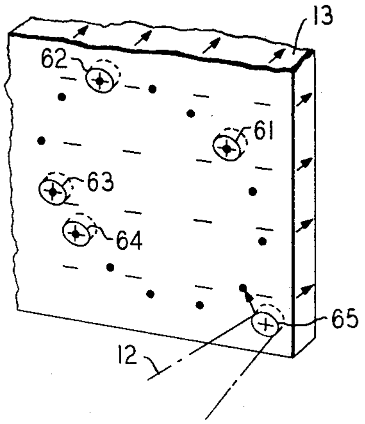
Figure 6D:
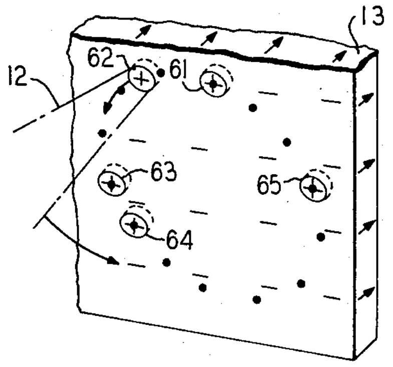

As illustrated in FIG. 6C, bubble domains 61, 62, 63, 64 and 65 from the nucleated group are then illustratively positioned at the desired locations in the loop, one at a time, using laser beam 12 in the attractive power range. Information is thus stored in the loop, it being represented by the absence or presence of a bubble on a particular burn spot. To obtain shift register operation, a first bubble in the loop (e.g., bubble 65) is trapped on beam 12 and the beam is circularly scanned about the loop, for example, in a counterclockwise direction. As the beam rotates, it carries only the first bubble until it collides with the next bubble in the loop (e.g., bubble 61). In this collision, the beam drops the first bubble and picks up the next, and so on, around the loop. As seen in FIG. 6D, however, if beam 12 is rotated in a counterclockwise fashion and if the burn spots are properly spaced (e.g., about 3 bubble radii apart), the first bubble is dropped in the collision at the burn spot adjacent to the one originally occupied by the next bubble on the clockwise side. A counterclockwise motion of beam 12 around the loop thus gives a step-by-step shift of the information in a clockwise direction, and vice versa. The sequence of bubbles and spaces thus represents binary data which is moved in a clockwise direction around the data loop.

Figure 7A:
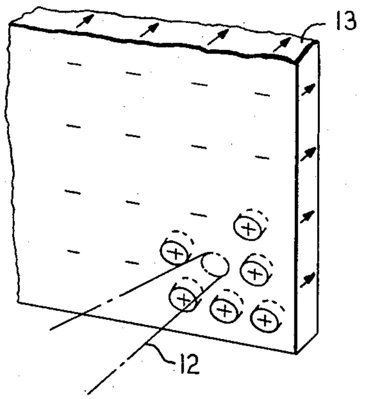
Figure 7B:
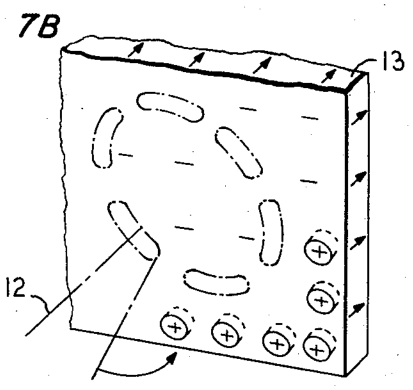
Figure 7C:
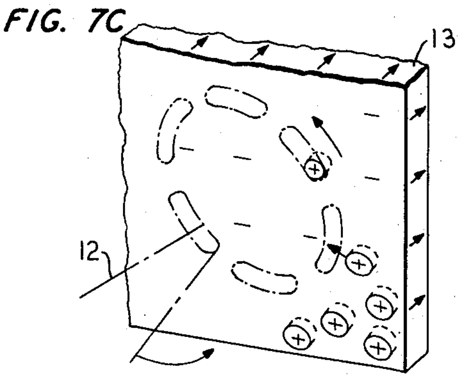

FIGS. 7A, 7B, and 7C illustrate the operation of a related memory device. In FIG. 7A, beam 12 in the apparatus of FIG. 1 is used to create in an open region of layer 13 a group of bubbles. A looping pattern of discrete laser spots is then formed in a region of layer 13 in proximity of the group of freshly nucleated bubbles. The light pattern is formed by splitting beam 12 to provide a plurality of regularly spaced beams from source 11 or, as shown in FIG. 7B, by periodically pulsing beam 12 on and off with apparatus 15 as it rotates about a circular orbit. If X is the number of discrete laser spots that are desired in the loop, the beam is pulsed on exactly X times per rotation of the beam. Using laser powers in the attractive range, each laser spot in FIG. 7B acts as a possible trap and bit location for a bubble. As shown in FIG. 7C, it is possible to displace rotating beam 12 relative to layer 13 so that a bubble from the nucleated group is picked up and trapped by a selected laser spot. The loop can be filled with information in this manner. By laterally displacing beam 12 slowly relative to layer 13 as it rotates, the entire bubble loop can also be laterally displaced as beam 12 successively corrects the position of each bubble in its orbit. Lateral displacements or up to seveal bubble diameters per rotation cycle are possible while still retaining the information in the loop, because of the distances at which the forces exerted by the beam are effective in attracting the bubbles. The laser spots and, therefore, the bubbles trapped thereon can be made to rotate around the loop in shift register fashion simply by slightly varying the rate at which the beam is chopped while maintaining constant the rate at which the beam rotates, or vice versa.

The information in the disclosed devices can be read or detected in a variety of ways using analyzer 25 and detector 27. The beam from the argon laser source has an inherent polarization. Using the beam in a low-powered mode so as not to give rise to random temperature changes in layer 13, one can detect the presence of bubbles at the various bit locations by scanning the beam through the locations and by sensing the change in polarization due to Faraday rotation. Alternatively, a low-powered beam from source 11 or from an auxiliary source can be fixed at a selected region in layer 13 and the information successively moved through the region in the previously described shift register fashion. Overall viewing of the layer is also possible using an auxiliary source of low-powered polarized light which is made incident on large areas of layer 13.

Figure 8A:
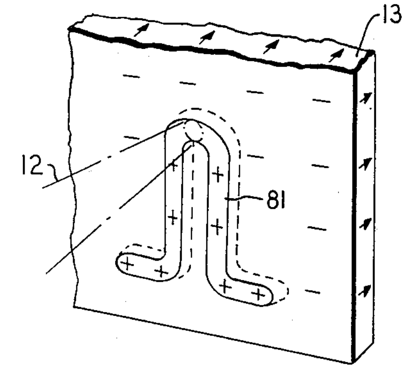
FIGS. 8A through 8D are perspective representations of portions of layer 13 illustrative of the various operations with magnetic strip domains in accordance with the invention.
Figure 8B:
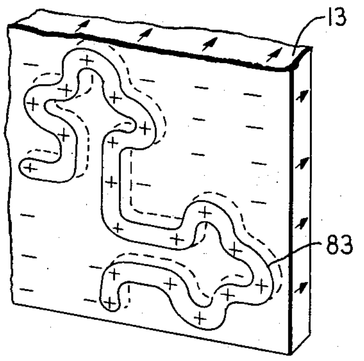

Various manipulations with strip domains are also possible utilizing the apparatus of FIG. 1. Starting with a bubble domain trapped on beam 12 having a cw power of about 50 mw (attractive power range), one can nucleate a short strip domain in layer 13 simply by lowering the applied bias field to the range in which the strips are stable. By displacing the beam relative to layer 13 and transverse to the strip domain, one can pull out the center of the strip and extend it into double-line, hairpin-shaped domain 81, as illustrated in FIG. 8A of the drawing, which remains after the beam is removed. By manipulating beam 12 about layer 13, the hairpin domain can be further extended and elaborate domain patterns, such as domain pattern 83 in FIG. 8B, can be written in script form. The script writing is characterized by the fact that it leaves a double-lined replica of every location the laser has been in the layer. It is accordingly possible, for example, to write one's name in miniature script in layer 13 using this technique in the same manner that one uses any conventional writing implement.

Figure 8C:
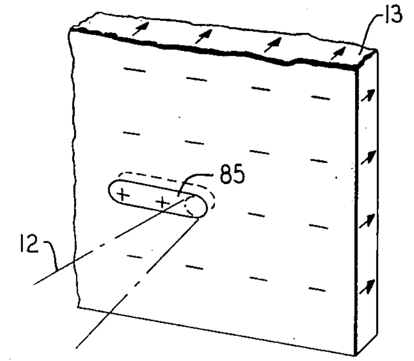
Figure 8D:
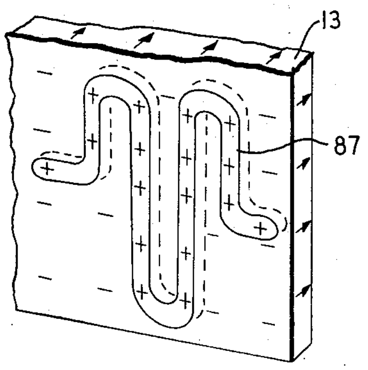

Alternatively, attractive cw beam 12 can be moved to a free end of a freshly nucleated strip domain 85 in FIG. 8C, and used to extend the domain longitudinally and to write various single line patterns, such as domain pattern 87 shown in FIG. 8D.

The laser affects strip domains in much the same manner that it affects bubble domains in layer 13. Thus, either attractive or repulsive forces can be exerted on the strips at relatively low and relatively high beam powers, respectively. In the script writing technique, the laser beam can be used to push the strip domains to obtain the hairpin patterns, as well as to pull them in the manner illustrated in the drawing.

At the high end of the stable strip domain bias range, the hairpin domains could be contracted and the patterns drawn by the laser in the script writing technique could be erased with the beam simply by drawing the pattern in reverse. At lower bias fields, erasure was not possible in the materials tested. The patterns in the single line writing technique were erasable at high bias fields, by bending the lines back along their original direction.

These strip domain manipulations constitute a novel form of reversible domain writing which has potential application in magneto-optical information storage and display devices. It should be noted that in any collision of strip domains, the laser beam drops one domain and picks up the next. The writing is thus limited by the inability to cross-connect domains.

We claim:

1. A magnetic device of the type comprising a layer of low coercivity magnetic material in which magnetic domains can be stored and propagated, said layer being a magnetically anisotropic single crystalline material selected from the group of materials consisting of orthoferrites and synthetic ferrimagnetic garnets, said material having a preferred direction of magnetization normal to the plane of said layer, a characteristic thermal time constant, and a characteristic Curie point temperature above which the magnetization of said layer becomes negligible, and including means for applying a magnetic bias field to said layer essentially along said preferred direction, said device being characterized by means external to said layer for nucleating magnetic domains therein without altering the applied magnetic bias field, said nucleating means comprising a source of at least one beam of radiant energy,
means for directing the incidence of the beam to a localized region of said layer having a cross-sectional area less than that of the desired magnetic domain,
means for controlling the power of the beam, and
means for controlling the time period of the incidence of the beam,
the beam being at least partially absorbable in said localized region to cause localized heating thereof to a temperature above the Curie point temperature of the material within a time period of the order of the thermal time constant of the material.

2. A magnetic device of the type comprising a layer of low coercivity magnetic material in which magnetic domains can be stored and propagated, said layer being a magnetically anisotropic single crystalline material selected from the group of materials consisting of orthoferrites and synthetic ferrimagnetic garnets, said material having a preferred direction of magnetization normal to the plane of said layer and including means for applying a magnetic bias field to said layer essentially along said preferred direction, said device being characterized by means external to said layer for propagating magnetic domains therein without altering the applied magnetic bias field, said propagating means comprising a source of at least one beam of radiant energy,
means for directing the incidence of the beam to a localized region of said layer, the beam being at least partially absorbable in said region to cause localized heating thereof,
means for continuously moving the beam relative to said layer, and
means for controlling the power of the beam to provide the beam with a beam power sufficient to yield attractive forces on magnetic domains in said layer such that a magnetic domain positioned near the center of the beam is trapped there and continuously propagated in said layer as the beam is moved relative to said layer.

3. The device of claim 2 in which said power controlling means provides the beam with a power sufficient to burn the material of said layer, and including means for focusing the beam to a cross-sectional area substantially smaller than that of the magnetic domains, the beam yielding a discrete burn spot in said layer upon which a magnetic domain can be fixed for a selected time and subsequently removed with the beam.

4. A magnetic device of the type comprising a layer of low coercivity magnetic material in which strip magnetic domains can be stored and means for extending the area of the strip domains into selected domain patterns in said layer, said device being characterized in that said extending means comprises a source of at least one beam of radiant energy,
means for directing the incidence of the beam to localized regions of said layer, the beam being at least partially absorbable in said regions to cause localized heating thereof,
means for controllably moving the beam relative to said layer, and
means for varying the power of the beam to provide successively attractive and repulsive forces on strip domains in said layer at a first beam power and a second relatively higher beam power, respectively, said forces being of sufficient magnitude to extend the area of the strip domains controllably in said layer in response to the motion of the beam.

5. The device of claim 4 in which said directing means directs the beam to an end of a strip domain in said layer, and said moving means moves the beam in a manner to extend the domain longitudinally into the selected pattern.

6. The device of claim 4 in which said directing means directs the beam to approximately the center area of a strip domain in said layer, and said moving means moves the beam transverse to the domain in a manner to extend the center area into a hairpin-shaped pattern in a form of magnetic script writing.

7. The device of claim 6 in which the pattern written by the beam is reversible by moving the beam in reverse.

* * * * *